May 15, 1928.

H. G. S. ANDERSON 1,669,406

PROCESS AND APPARATUS FOR PRODUCTION OF METALS FROM ORES

Filed Sept. 11. 1924

INVENTOR
Hector G. S. Anderson
BY Arthur P. Knight
ATTORNEY

Patented May 15, 1928.

1,669,406

UNITED STATES PATENT OFFICE.

HECTOR G. S. ANDERSON, OF ROLLA, MISSOURI.

PROCESS AND APPARATUS FOR PRODUCTION OF METALS FROM ORES.

Application filed September 11, 1924. Serial No. 737,057.

This invention relates particularly to the production of zinc from zinc sulfide ores and also to the production of zinc, and other metals from complex sulfide ores and the main object of the present invention is to provide for the economical production of zinc from such ores by the continuous process as distinguished from the ordinary batch operation of Belgian retorts. A further object of the invention is to provide for direct production of zinc from sulfide ores without necessity of a roasting operation thereby simplifying the production of zinc and also enabling the reduction operation to be carried on at a lower temperature than is possible in reduction of the oxide. A further object of the invention is to provide for production of zinc and other metals from complex sulfide ores in such manner as to effectively and economically separate the zinc from the other metallic constituents of such complex ores. A further object of the invention is to provide an improved furnace for reduction of ores or for retorting of zinc ores or other materials.

The accompanying drawings illustrate an apparatus for carrying out my invention and referring thereto:

Figure 1:
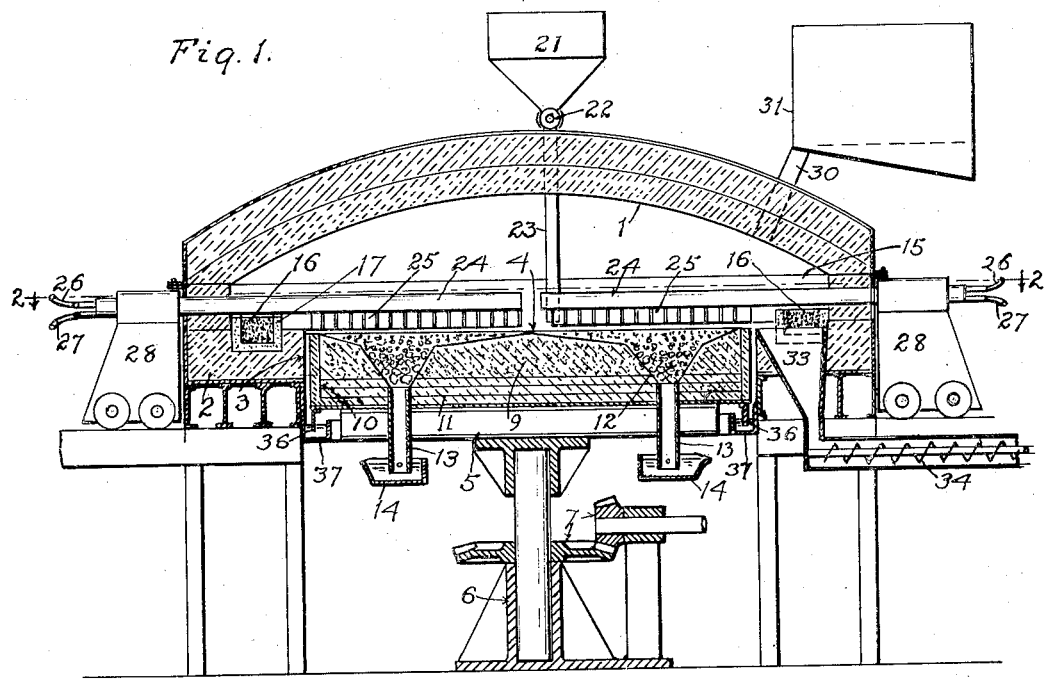
Fig. 1 is a vertical section of a retort or furnace suitable for reducing and distilling zinc from ore, said section being taken on line 1—1 in Fig. 2.
Figure 2:
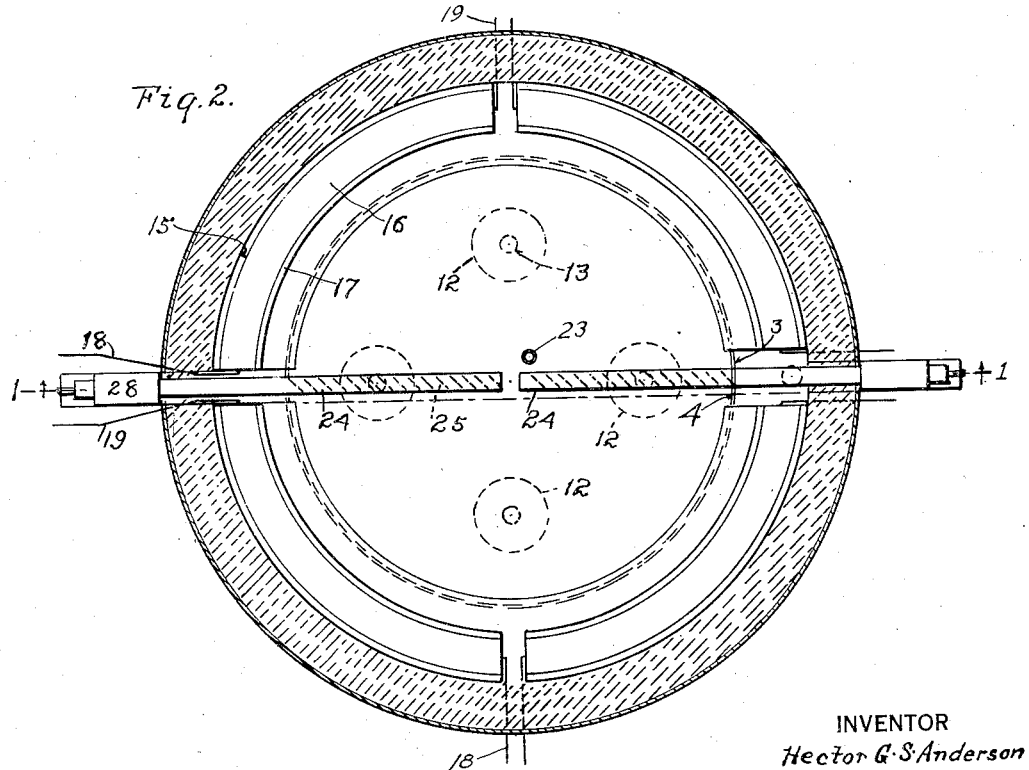
Fig. 2 is a section on line 2—2 in Fig. 1.

The furnace shown in Figs. 1 and 2 comprises a chamber 15 formed of refractory brick and having for example a curved roof 1 and a floor portion 2, the latter having a circular opening 3 within which is mounted to rotate a circular hearth 4. Said hearth 4 is carried by a suitable frame 5 mounted to turn in bearing 6 and provided with a driving means 7 whereby it may be slowly rotated. Said hearth is further provided with a bed 9 of refractory material for example coke and tar suitably tamped and mounted within the carborundum ring 10 resting on a bed of insulating brick 11. Said bed 9 is provided with drains or passages 12 and a filling of loose coke or other suitable material is placed in these passages and over-lies the bed so as to provide for drainage of melted material to outlets 13 at the bottom of said passages 12, said outlets discharging said molten material into suitable collecting cups 14 which are emptied when required in any suitable manner.

A resistor is mounted within the chamber 15 below the roof 1, said resistor consisting for example of one or more resistor elements 16 mounted in carborundum troughs 17 in the floor portion 2 so as to extend below the roof 1 and around the hearth 4. Said resistor elements may be of any suitable construction being for example of carbon or graphite of suitable resistance and being preferably formed in a number of sections which are connected by wires 18 and 19 to energizing circuits in well-known manner of such devices.

Means are provided for feeding material to the furnace in any suitable manner, said means comprising, for example a feed hopper 21 provided with feed control means 22 and with an outlet pipe 23 extending into the furnace chamber 15 and discharging the ore or other material onto the hearth 4 preferably near the center thereof.

Rabble means are provided which are preferably stationary when in operation and comprise any desired number of rabble arms 24 extending into the furnace chamber 1 and provided with rabble blades 25 which extend close to the upper surface of the hearth 4 and are mounted at an angle as shown in Fig. 2 so as to cause turning over and progressive outward advance of the material on the hearth by the action of said rabble blades as such material is carried around by the rotation of the hearth. In case the furnace is used for desulfurization and volatilization of zinc said rabble blades may be of graphite or carborundum and the holders therefor which are mounted on the rabble arm may be also of carborundum. The rabble arms may consist of iron piping covered with refractory protective material such as fire clay. Suitable means such as water pipes indicated at 26 and 27, may be provided for circulating water through the respective rabble arms to prevent undue heating thereof and said rabble arms are preferably mounted on movable carriages indicated at 28 to enable the same to be withdrawn from the furnace when desired, it being understood that the side wall of the furnace will be formed with a channel to permit the passage of rabble blades in such withdrawal, said channel being normally closed by luting or otherwise, and the resistors are preferably made in sections as above described so as to permit such passage of the rabble blades and also to facilitate location of any defect in the resistors.

In case the furnace is used for retorting of zinc or other material a vapor outlet indicated at 30 will be provided leading to a suitable receiving means such as a condenser indicated at 31.

Suitable means are provided for discharging from the furnace gangue or residual solid material which accumulates in the operation of the furnace. For this purpose a hopper indicated at 33 may be provided at one side of the rotary hearth 4 so as to receive solid material discharged from said hearth by the rabbles aforesaid, said hopper leading to any suitable delivery means, for example a screw conveyer indicated at 34.

In order to prevent loss of zinc vapor or leakage of air into the muffle or furnace chamber a seal is provided consisting for example of an annular flange 36 extending downwardly from the rotary hearth into an annular trough 37 which may contain a body of molten metal or of finely divided solid material to form a seal while permitting rotation of the hearth.

I will described the carrying out of my process as applied to the treatment of complex ores containing for example zinc and lead, with in some cases copper, gold or silver or two or more of such metals.

The complex ore is crushed to pass 48 mesh, more or less, if it has not already been crushed to pass that mesh during the process of concentration, and it is dried to expel the moisture so that no water vapor will be present in the desulfurizing furnace.

The ore, or concentrate, is drawn continuously from storage bins and mixed with the necessary amount of finely divided sponge iron to completely desulfurize the zinc sulfide, lead sulfide and to satisfy the extra atom of sulfur in the iron pyrites; and, in addition, a sufficient excess or sponge iron to provide the intimate contact with the zinc sulfide and lead sulfide and iron pyrites which is necessary to obtain substantially complete desulfurization. This mixture is then fed continuously to the furnace chamber through feed pipe 23. On account of the comparatively low temperature at which the extra atom of sulfur distills off of the iron pyrites (the extra atom of sulfur distills off of $FeS_2$ at about 700° C. when air is excluded), this sulfur will be distilled off within the confines of the vertical feed pipe, which extends through the roof of the furnace and to the top of the hearth, and will combine with the sponge iron before it comes into the higher temperatures of the desulfurization chamber of the electric zinc furnace, and will not exist as vaporized elemental sulfur. The desulfurization of the zinc sulfide and the lead sulfide is accomplished by actual contact with the sponge iron so that no sulfur vapor, or substantially none, exists in the desulfurization furnace. The sequence of the affinity of the commoner metals for sulfur is as follows:

Manganese (greatest affinity).
Copper.
Nickel.
Iron.
Tin.
Zinc.
Lead (least affinity).

Which indicates that zinc and lead are desulfurized by iron but the copper is not desulfurized by iron, and hence there will be a mixture of copper sulfide and iron sulfide discharged from the furnace.

For the purpose of withdrawing the molten lead from the hearth continuously, the steel hearth-bottom is provided with the drains 12 permitting the molten lead to drain to openings 13 in the bottom of the hearth. It is preferable that there be one drain for each quadrant and these drains will have the form of inverted cones which are filled with coarse coke at the bottom, the coke decreasing in size until the level of the top of the hearth is reached. Upon desulfurization of the lead sulfide by the sponge iron, the molten lead works its way downward through the coke and is withdrawn continuously.

The temperature at which the furnace is operated will most preferably be as high as is possible without making the copper sulfide and the iron sulfide molten, or even viscious because it is easier to continuously discharge this material when it is in a pulverulent form. It is not impossible to discharge this material when it is in a state of incipient fusion or molten but it is more readily done and the metallurgical results are as satisfactory when the temperature is kept below the fusing temperature of the sulfides. I have operated at a temperature of 1080° C., and found that the ferrous sulfide may be kept pulverulent at this temperature but I have chosen a temperature of about 1050° C., more or less, as one which seems best in order to secure the most favorable mechanical conditions. As this is a continuous operation and as the thickness of the charge, generally not over an average of one-half inch (½″) deep, is very small compared to the thickness of the charge in the Belgian retort and other processes it is not necessary to reach the high temperatures that are held to be necessary in these latter processes in order to finish the operation and completely distill off the last of the zinc.

The continuous rabbling of the charge exposes the components to a uniform heat, which, together with the thin bed of the ore charge, permits the operation to be carried on at a lower temperature and with equally as good metallurgical results as when the higher temperatures are used.

Provision is made for the reduction of any carbon dioxide to carbon monoxide because some calcite or some limestone is apt to be introduced into the charge from the ore; likewise, provision is made to remove the free oxygen in the entrained air introduced with the ore so that nothing will be allowed to exist in the furnace which will oxidize the zinc vapor. Carbon may be introduced especially for this purpose but as a matter of fact there will nearly always be sufficient carbon present in the sponge iron to effect this purpose so that it will not actually be necessary to introduce additional carbon.

The zinc vapor is in such a highly concentrated form that saturation takes place and condensation begins at approximately the boiling point of zinc, 930° C. The percentage of zinc vapor present, by volume, is from 97% to 98%; in the ordinary reduction of a roasted ore containing zinc by carbon the percentage is approximately 50% of zinc vapor to 50% of carbon monoxide, at which percentages the condensation of the zinc vapor does not begin until about 860° C.

On account of the fact that the lead is continuously withdrawn, and therefore does not gradually accumulate in the molten condition in increasingly larger amounts toward the end of each cycle as in the intermittent processes at which time the temperatures are highest, approximating 1200° C., and on account of the uniformly lower temperature used, there is no tendency to volatilize large amounts of lead which would lower the grade of the spelter.

The copper sulfide and the iron sulfide are discharged with some pellets of lead from the desulfurizing furnace through discharge means 34. If this material is discharged hot directly from the desulfurizing furnace to the roasting furnace the lead fume must be settled in settling chambers or be lost. If the lead is present in too small amounts to pay for its recovery from settling chambers it is just as well to discharge hot directly to the roasting furnace and waste the lead and thereby utilize the sensible heat of the hot sulfides in the roasting operation. The circumstances will dictate the procedure to follow. Therefore, two methods are available: To discharge the iron and copper sulfides directly to a roasting furnace and allow the lead fume to settle in settling chambers or go to waste; and to cool the discharge and pass it over magnetic separators which will separate the slightly magnetic iron copper sulfides from the lead pellets.

The iron oxide and copper oxide, which constitutes the calcine, will be metallized in a sponge iron furnace producing sponge iron and metallic copper. The metallized product will be passed over a magnetic separator whereby the sponge iron containing a small amount of metallic copper, and the major portion of the copper together with gangue material will form the magnetic and the non-magnetic products. The fact that a small amount of copper accompanies the sponge iron does not hinder its effectiveness as a desulfurizer since copper has even a stronger affinity for sulfur than has iron. The copper concentrate should contain no less than 30% metallic copper to be capable of melting down to a marketable grade of copper. If the metallic copper concentrate is not as high as 30% copper, it should be concentrated to that grade by concentration, preferably water concentration. The gold and silver are separated from the lead bullion by the customary methods.

The principal advantages of this process over existing processes are as follows:

It is unnecessary to roast the ore, or concentrate, thereby eliminating the cost of roasting and the accompanying dust losses. Zinc vapor is in a highly concentrated condition and is thereby capable of more efficient condensation than when reduction by carbon is carried on. The lower temperature at which the operation is carried on does not permit the volatilization of as much of the lead as does the higher temperatures of the Belgian retort and other intermittent processes, hence the lead content of the spelter is lower. The iron pyrite, which invariably accompanies the complex ores, is used as a source of iron for sponge iron and is generally in sufficient amount to more than provide for the losses during roasting and metallization so that no outside iron ore is necessary after the operation is once under way. The operation is continuous rather than intermittent. The small depth of the charge, averaging about ½" more or less, and the continuous rabbling action permits the charge to be more uniformly and efficiently heated which, in turn, permits a lower temperature to be used. Furthermore, the operations results in a substantially complete separation of the zinc from the rest of the ore and permits marketable products to be produced of zinc, lead, copper and gold and silver without previous attempts at separation of the several component minerals of the ore before the actual furnacing operation; if the ore has to be concentrated at all the separation should be made of all of the minerals from the gangue of the ore rather than attempts at preferential flotation of the several minerals constituting the ore. Furnace units may be constructed from a few pounds per day up to 50 tons per day.

The process may also be applied to treatment of zinc ores which contain little or no lead, copper or other valuable metal, and in that case the calcines are likewise metallized and the sponge iron is re-used to desulfurize additional zinc sulfide.

In some cases instead of the electrical resistors shown I may use radiator elements formed as tubes, for example carborundum tubes, provided with burner means for generating heat by the combustion of gas, oil, or other suitable fuel, for example, as shown in Patent No. 1,452,626, issued April 24, 1923, to E. B. Thornhill for apparatus for production of sponge iron and other metallic products. However in case of zinc desulfurization, using heat generated by combustion in this manner, there is a liability to production of blue powder by leakage of combustion gases into the furnace; so that when operating with a furnace in which the heat is generated by combustion within heat radiating tubes it will generally be expedient to produce zinc oxide rather than spelter, the zinc being volatilized and then oxidized previous to collection and the resulting zinc oxide being sold as such or reduced to metallic zinc in any suitable manner. In any case when producing zinc vapor in a furnace either heated electrically or by combustion in radiation elements it is desirable to provide the furnace with a steel jacket so as to prevent loss of zinc vapor.

My improved method of zinc desulfurization may be used with other forms of furnaces and on the other hand the furnace herein shown and described is capable of application to other purposes besides zinc desulfurization, for example, to the production of sponge iron as set forth in the patent to E. B. Thornhill, No. 1,452,627, April 24, 1923, or in the production of metallic tin, and in either of such cases the means for drawing off and condensing vapor being in that case omitted, and the reducing agent may be coke or carbon in any suitable form. The furnace as shown in the drawing and comprising the means for drawing off and condensing the vapor may be used for retorting solid material of any kind, for example, in the retorting of oil shale or lignite or for the production and collection of phosphoric acid by the reduction of phosphate rock and oxidation of the resulting phosphoric vapor. In any case where an oxidized product is required provision is made for introducing air to the means for drawing off and collecting the volatilized product.

The distinguishing feature of the furnace above described is that the heating element (the resistor) is located around the hearth and below the roof so as to heat the material on the hearth both by reflected or secondary radiation from the roof and by conduction due to heating of the gas or vapor within the muffle chamber by direct action of the heating element and transfer of the heat through the gas or vapor to the material on the hearth. In this case therefore the material on the hearth is subjected to heat by radiation from heating surfaces above the same and by direct contact with the gas or vapor. In this case however as in the furnace shown in the patent to Thornhill above referred to the heating is effected wholly by emission of heat from a solid surface without the introduction of heating gases into the reaction chamber of the muffle.

What I claim is:

1. The process of recovering zinc from zinc sulfide bearing material which consists in heating such material in finely divided condition with finely divided iron mixed therewith, to a temperature which is sufficiently high to effect reaction and volatilization of zinc resulting from such reaction but not sufficiently high to cause the melting of the iron sulfide resulting from such reaction, so that the residual material containing such iron sulfide is maintained is finely divided condition; and withdrawing the volatilized zinc from the residual finely divided material.

2. The process of treating complex sulfide ores of zinc and lead which consists in heating such ores in divided condition in the presence of finely divided metallic iron, and in the absence of oxygen, to a sufficient temperature to result in desulfurization and volatilization of the zinc and desulfurization and fusion of the lead while maintaining the remainder of the residual material, including iron sulfide, in finely divided condition, and separately withdrawing and collecting the volatilized zinc and liquid lead from the finely divided residual material.

3. The process of treating complex sulfide ore of zinc, lead and silver or gold, which consists in subjecting such ore, in pulverulent condition, in the presence of finely divided metallic iron, to sufficient heat to cause desulfurization and vaporization of zinc, and desulfurization and fusion of lead, while maintaining the residual material, including iron sulfide, in pulverulent condition, separately withdrawing and collecting the zinc vapor and liquid lead from such pulverulent residual material, treating the produced lead for the recovery of gold or silver, and treating the residual pulverulent material for recovery of finely divided metallic iron for use in cyclic operation of the process.

4. The process of treating sulfide ores of zinc containing iron which consists in heating such ores in pulverulent condition in the presence of finely divided metallic iron and in the absence of oxygen to a sufficient temperature to result in desulfurization and volatilization of the zinc without fusion of the resulting iron sulfide, so as to maintain the residual material in pulverulent condition and in production of iron sulfide from the metallic iron, withdrawing and collecting the zinc so volatilized from such pulverulent residual material and treating the remaining material for the production of finely divided metallic iron for cyclic operation of the process.

5. A process as set forth in claim 4 wherein the said zinc sulfide ore also contains copper and the material remaining after volatilization of the zinc is treated for separate recovery of the iron and copper.

In testimony whereof I have hereunto subscribed my name this second day of September, 1924.

HECTOR G. S. ANDERSON.